United States Patent [19]
Hoffman

[11] 3,823,284
[45] July 9, 1974

[54] FOOT OPERATED VEHICLE SIGNALLING APPARATUS WITH ADJUSTABLE MECHANICAL LINKAGE OPERATING MECHANISM

[76] Inventor: Benedict J. Hoffman, 2230 Chestnut St., Fort Wayne, Ind. 46803

[22] Filed: Mar. 19, 1973

[21] Appl. No.: 342,683

[52] U.S. Cl. .............................. 200/61.89, 340/71
[51] Int. Cl. ............................................ H01h 3/14
[58] Field of Search .............................. 200/61–89, 200/153 R, 61.46, 61.89, 86.5, 153 P, 158, 156, 153 C; 340/71

[56] References Cited
UNITED STATES PATENTS

| | | | |
|---|---|---|---|
| 1,785,366 | 12/1930 | Shoenberg et al. | 200/61.89 X |
| 1,861,101 | 5/1932 | St. George et al. | 200/61.89 X |
| 2,286,162 | 6/1942 | Schellenger | 200/67 C |
| 2,526,611 | 10/1950 | Rodrick | 200/61.89 X |
| 2,704,360 | 3/1955 | Werstein | 200/61.89 X |
| 3,428,767 | 2/1969 | Pfeifer | 200/61.89 |
| 3,651,293 | 3/1972 | Hoffman | 200/61.89 X |

*Primary Examiner*—James R. Scott
*Attorney, Agent, or Firm*—Albert L. Jeffers; Roger M. Rickert

[57] ABSTRACT

An adjustable hinge linkage connects a control switch with an auxiliary pedal which is actuated by the accelerator pedal of a motorized vehicle. The control switch is actuated by movement from any first switch position to a new switch position so that an automatic signalling apparatus is provided for the control of multicolored lights in response to a change in the position of the accelerator pedal. Thus a colored signal light automatically communicates intended vehicle velocity changes to other drivers before the intended velocity changes occur.

15 Claims, 3 Drawing Figures

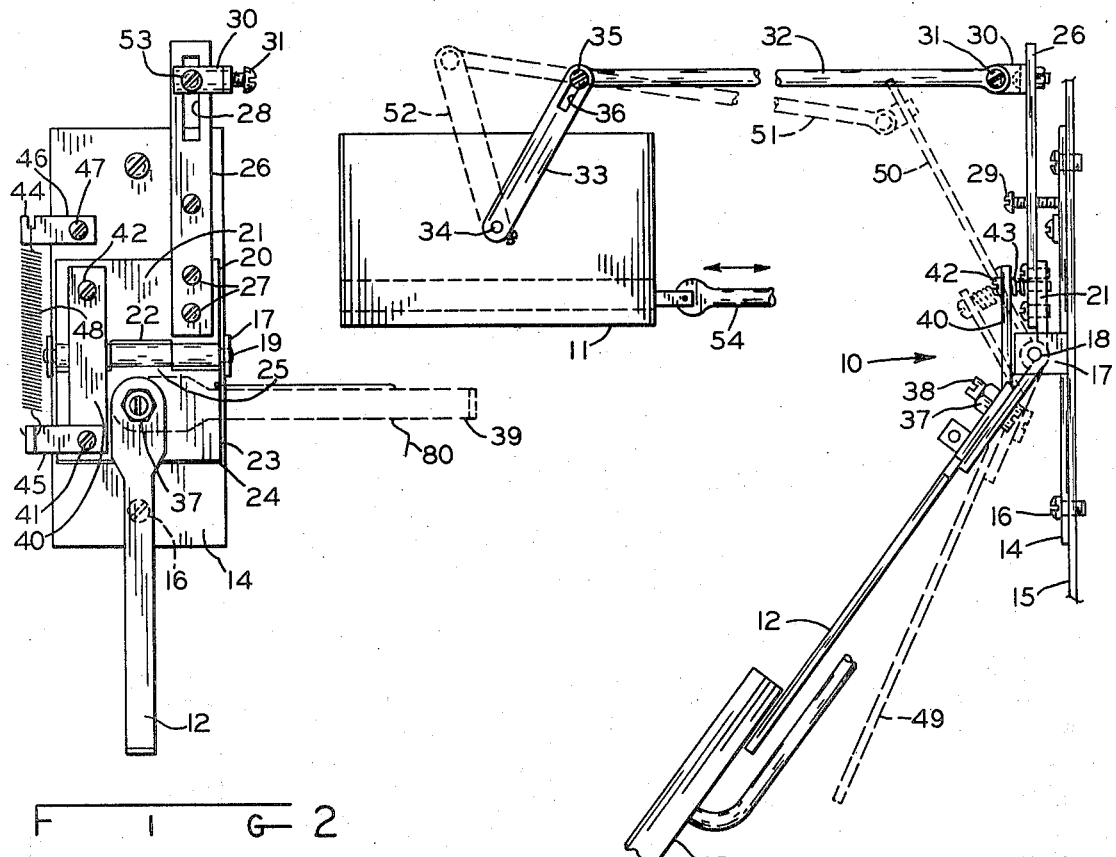

FOOT OPERATED VEHICLE SIGNALLING APPARATUS WITH ADJUSTABLE MECHANICAL LINKAGE OPERATING MECHANISM

BACKGROUND OF THE INVENTION

An electric teeter-totter switch was disclosed and claimed in U.S. Pat. No. 3,651,293 of common inventor entity which patent is hereby incorporated by reference in the present disclosure. The use of this switch for the control of automobile warning lights is fully described in the reference patent. The present invention provides a unique linkage mechanism for interconnecting the teeter-totter switch and the accelerator pedal of a motorized vehicle.

SUMMARY OF THE INVENTION

The present invention provides a unique linkage for the interconnecting of a switch, such as that which is described in U.S. Pat. No. 3,651,293, with the accelerator pedal of an automobile. This linkage is in the form of an adjustable hinge and adjustments are provided so that the invention may be used with a variety of sizes and makes of motor vehicles and so that the invention may be used under widely varying driving conditions. In addition, provision has been made for disconnecting the signalling device for driving conditions where the use of the signalling device may not be advantageous.

A first objective of the present invention is to provide an adjustable linkage that can be used on a wide range of sizes and makes of motor vehicles.

A second objective is to provide an adjustable linkage that provides an adjustable stop position for the linkage.

A third objective is to provide a position adjustment between the stop position and the switch.

A fourth objective is to provide a mechanical ratio adjustment between accelerator movement and the switch.

A fifth objective is to provide an adjustment to set the initial clearance between the accelerator pedal and the auxiliary pedal of the adjustable linkage.

A sixth objective is to provide a mechanical disconnect which selectably prevents the engagement of the accelerator pedal with the auxiliary pedal.

A seventh objective is to provide a conveniently located manual control for selectively actuating the mechanical disconnect.

These and other objectives of the present invention will appear more clearly from the drawings and detailed description.

BRIEF DESCRIPTION OF THE DRAWINGS

FIG. 1 is a side view of the adjustable linkage, switch and accelerator pedal.

FIG. 2 is a front view of the adjustable linkage with the switch and accelerator pedal deleted.

FIG. 3 is a side view of the remote disconnect mechanism.

DESCRIPTION OF THE PREFERRED EMBODIMENT

Referring now to FIGS. 1 and 2, an adjustable hinge linkage 10 is connected to a switch 11 and includes an auxiliary pedal portion 12 for actuation by a manual speed control member such as accelerator pedal 13.

Adjustable hinge linkage 10 includes a base 14 being adapted for mounting to a floorboard 15 of an automobile or other motorized vehicle by screws 16, a pair of clevis tabs 17 each having a pin hole 18 therethrough and each being integral with base 14, a clevis pin or hinge pin 19 being inserted through pin holes 18, a first hinge arm assembly 20 which includes a first hinge plate 21 having a first end 22 being notched in the center thereof and being formed around pin 19 to provide pivotal support adjacent to clevis tabs 17, and a second hinge arm assembly 23 which includes a second hinge plate 24 having a first end 25 being notched on both sides and being formed around pin 19 to provide pivotal support on pin 19 between the portions of first end 22 of first hinge plate 21 which are formed around pin 19.

First hinge arm assembly 20 includes lever 26 being attached to first hinge plate 21 by screws 27, having a slot 28 in the end remote from plate 21, and having adjustable stop screw 29.

A link pin assembly 30 is clamped to lever 26 by a clamp bolt 53 and may be adjusted as permitted by slot 28. Link pin assembly 30 includes a shoulder screw 31 which provides a connection between lever 26 and a link 32.

A torsional input lever 33 co-operates with a torque shaft 34 to comprise a mechanical input member for switch 11. A ratio adjusting screw 35 co-operates with a slot 36 in input lever 33 for the attachment of link 32 to input lever 33.

Continuing to refer to FIGS. 1 and 2, second hinge arm assembly 23 includes swing portion or auxiliary pedal portion 12 which is attached to second hinge plate or pivot portion 24 by means of a swing screw assembly 37. Screw assembly 37 includes a slotted portion 38 which is keyed to auxiliary pedal 12 by any convenient means; and screw assembly 37 cooperates with second hinge plate 24 to permit auxiliary pedal 12 to be rotated to a position 39 as shown by the dash lines. Thus auxiliary pedal 12 can be rotated by slotted portion 38.

Adjustable hinge linkage 10 also includes a transfer arm 40 which is attached to second hinge plate 24 by a screw 41 and which is adjustably attached to first hinge plate 21 by an adjusting screw 42 and a spring 43; so that first hinge plate 21 and second hinge plate 24 may be adjustably positioned at an angle to each other and will then operate as a fixed assembly about pin 19. As an alternate to the spring 43, a slender nut may be provided on the adjustment screw 42 adjacent the transfer arm 40 on the side opposite the adjustment screw head.

Adjustable hinge linkage 10 also includes a spring return assembly 44 which includes a first spring attaching arm 45 being attached to transfer arm 40 and to second hinge plate 24 by screw 41, a second spring attaching arm 46 being attached to base 14 by a screw 47, and a return spring 48.

In operation, link pin assembly 30 and ratio adjusting screw 35 may be adjusted within the limits of slots 28 and 36, respectively, to provide the desired mechanical ratio between the movement of auxiliary pedal 12 and input lever 33 of switch 11. Link pin assembly 30 and ratio adjusting screw 35 may also be used to provide a limited amount of relative position adjustment between input lever 33 and first hinge arm assembly 20. Adjustable stop screw 29 may be adjusted to provide an initial position for switch 11. Then adjusting screw 42 may be adjusted to adjust the angle between hinge arm assemblies 21 and 24 and thereby to provide a small initial clearance between auxiliary pedal 12 and accelerator pedal 13.

Operation of switch 11 as a function of accelerator pedal movement, connection of colored lights to switch 11, and the operation under various conditions of acceleration and deceleration are all described in detail in U.S. Pat. No. 3,651,293 to which the reader is referred. Thus, it will suffice to describe the mechanical operation of adjustable hinge linkage 10.

Referring again to FIGS. 1 and 2, depressing accelerator pedal 13 to position 49 closes the small initial clearance between accelerator pedal 13 and auxiliary pedal 12, and rotates auxiliary pedal 12 and second hinge assembly 23 counterclockwise about pin 19 as viewed in FIG. 1. Rotation of second hinge assembly 23 is effective to rotate first hinge assembly 20 about pin 19 to position 50 moving link 32 to position 51; and link 32 actuates input lever 33 to position 52.

Switch 11 also includes a sliding input member 54 which may alternately be connected to link 32 instead of connecting input lever 33 to link 32.

Referring now to FIG. 3, a torque transmitting flexible cable 60 comprising an inner coil spring 61 and an outer coil spring 64 which are coiled in opposite directions has a drive tang 62 at one end thereof for engaging the slotted portion 38 of the swing screw assembly 37. A selector knob 63 is coupled to a shaft 71 which in turn is coupled to the flexible cable 60 by a coupler 74. This coupler grips both the shaft 71 and the flexible cable 60 by set screws 77 and 78 and as illustrated at 75 may be provided with an adjustment gap whereby loosening of for example the set screw 78 will allow the cable 60 and drive tang 62 to be moved axially somewhat to allow optimum positioning of the tang 62 relative to the slotted portion 38. The spiraled cables 61 and 64 may be bonded together at 76 where they are gripped by the set screw 77 and may similarly be bonded together where they connect to the drive tang 62. A threaded flange 65 has a hole therethrough for passing the shaft 71 and co-operates with a nut 79 to attach a shaft support bracket 72 to for example a portion 66 of an automobile dash. A stop ring 73 having a set screw which when tightened clamps the stop ring 73 to the shaft 71 may be provided and positioned so as to limit the axial movement of the shaft 71.

The flexible cable 60 passes through a bushing or tube 79 and is free to rotate within that bushing to enable or disable the auxiliary pedal 12. The bushing 79 which directs the drive tang 62 is held in place by the clamp 67 which in turn is attached to the base 14 by clamp assembly 68 and screw 69. Thus knob 63 may be rotated to move the auxiliary pedal 12 to a position under accelerator pedal 13 or may be rotated to move the auxiliary pedal 12 to position 39 as shown in FIG. 2 where the automatic signalling apparatus is disconnected or disabled. The auxiliary pedal 12 may be held in position 39 by friction in the swing screw assembly 37, by a yieldable ball and socket connection or some other detent scheme between the auxiliary pedal 12 and the hinge plate 24. As illustrated in FIG. 1 a wire spring 80 supported on the hinge plate 24 is deflected by movement of the auxiliary pedal to its disabled position and functions to hold the pedal in that position until knob 63 is again actuated to activate the signalling apparatus. While the tang 62 and slotted portion 38 might be configured to be at all times engaged, in an actual preferred embodiment selective engagement and disengagement of the device by activating the knob 63 was only made while the accelerator pedal was in its released position and tang 62 did not engage the slotted portion 38 when the accelerator pedal was substantially depressed.

Thus while the present invention has been described with respect to a specific preferred embodiment numerous modifications will suggest themselves to those of ordinary skill in the art and accordingly the scope of the present invention is to be measured only by that of the appended claims.

I claim:

1. An improved signalling apparatus for motorized vehicles of the type having a propulsion motor, a manual speed control member, a source of electrical power, and a signal light, the improvement which comprises:

an electrical switch having a first contact which is connected to said source, a second contact which is connected to said signal light, and having a mechanical input member which is movable throughout a range of operating positions and which controls the engagement of said contacts as a function of the movement of said input member from any first position within said range to a second position within said range; and an adjustable hinge linkage mechanism operably interconnecting said speed control member and said input member comprising a vehicle supported hinge pin and first and second arms mechanically interconnected and extending from the hinge pin in different directions, one arm being connected to the speed control member and the other arm being connected to the input member, the mechanical connection between the two arms including adjustment means for selectively varying the angle between the arms.

2. An improved signalling apparatus as claimed in claim 1 in which said mechanical input member slides into said switch and further comprising means for selectively disengaging the speed control member from the said one arm.

3. An improved signalling apparatus as claimed in claim 1 in which said mechanical input member comprises a torque shaft and torsional input lever and further comprising means for selectively disengaging the speed control member from the said one arm.

4. An improved signalling apparatus for motorized vehicles of the type having a propulsion motor, an accelerator pedal, a source of electrical power; and colored signal lights, the improvement which comprises:

an electrical switch having a plurality of contacts which are connected to said source and to said colored lights and which selectively control the illumination of said colored lights, and having a mechanical input member which is movable throughout a range of operating positions and which controls the engagement of said contacts as a function of the movement of said input member from any first position within said range to a second position within said range;

and an adjustable hinge linkage mechanism which comprises a base being attached to said vehicle, a first hinge arm which includes a first end being pivotally connected to said base and a second end being connected to said mechanical input member, a second hinge arm which includes a first end pivotally connected to said base and a second end comprising an auxiliary pedal for pivotal actuation by said accelerator pedal, and means for adjustably interconnecting said hinge arms for pivotal actuation of said first hinge arm in response to pivotal actuation of said second hinge arm.

5. An apparatus as claimed in claim 4 in which a transfer arm being attached to one of said hinge arms and an adjusting screw operably interconnecting the other of said hinge arms and said transfer arm cooperate to comprise said adjustable interconnecting means.

6. An apparatus as claimed in claim 4 which includes a spring being inserted between said other hinge arm and said transfer arm.

7. An apparatus as claimed in claim 4 in which said device includes means for selectively rendering said device inoperative.

8. An apparatus as claimed in claim 7 in which said second hinge arm comprises a second hinge plate which includes said pivotal connection to said base, a swing portion which comprises said auxiliary pedal, and means for pinning said second hinge plate to said swing portion to allow angular positioning of said swing portion to an engaged position wherein said swing portion is positioned under said accelerator for said pivotal operation by said accelerator pedal and to a disengaged position wherein said swing portion avoids actuation by said accelerator pedal;

whereby said pinning means and said swing portion comprise said selective means.

9. An apparatus as claimed in claim 8 which includes a selector knob being mounted in said vehicle; and a flexible cable interconnecting said selector knob and said swing portion.

10. An apparatus as claimed in claim 4 which includes an adjustable stop between said base and one of said hinge arms to provide a stop position adjustably limiting the movement of said second end of said hinge arm in one direction.

11. An apparatus as claimed in claim 10 in which an adjusting screw being threaded in said first hinge arm and abutting said base comprises said adjustable stop.

12. An apparatus as claimed in claim 10 which includes a spring biasing said one hinge arm toward said stop position.

13. An apparatus as claimed in claim 4 in which said connection of said first arm to said mechanical input member is adjustable.

14. An apparatus as claimed in claim 13 in which said adjustment of said connection provides a relative position adjustment between said mechanical input member and said first hinge arm.

15. An apparatus as claimed in claim 13 in which said adjustment of said connection provides an adjustment in the proportional movement of said first hinge arm to said mechanical input member.

* * * * *